Sept. 28, 1971 J. HRIBAR 3,608,230
SINKER FOR FISHING LINES
Filed May 19, 1969 2 Sheets-Sheet 1
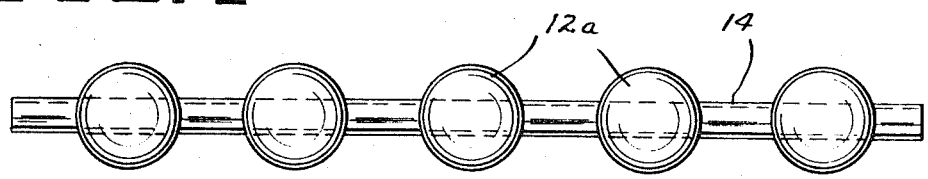
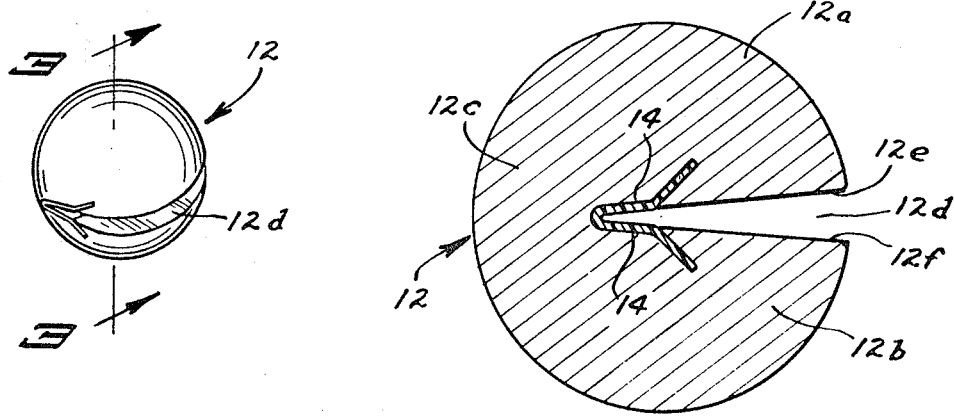
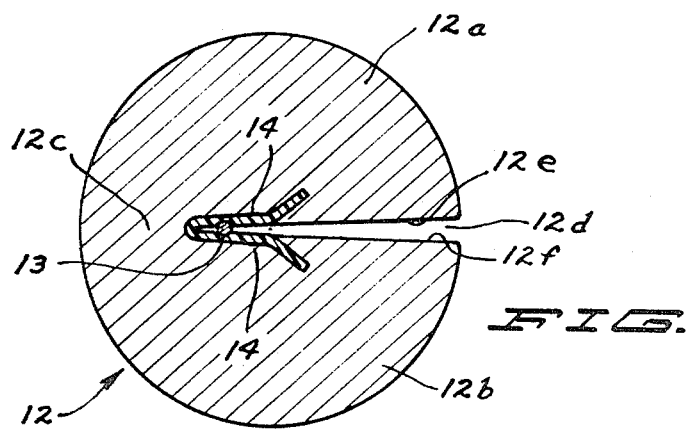
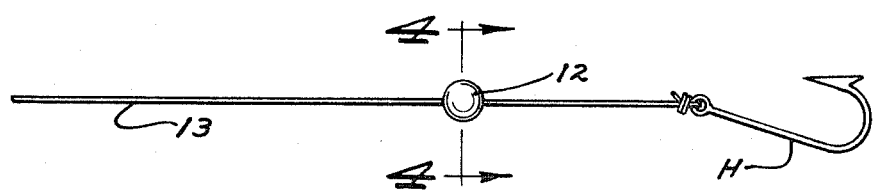
INVENTOR.
JOSEPH HRIBAR
BY
John W. Adams
ATTORNEY

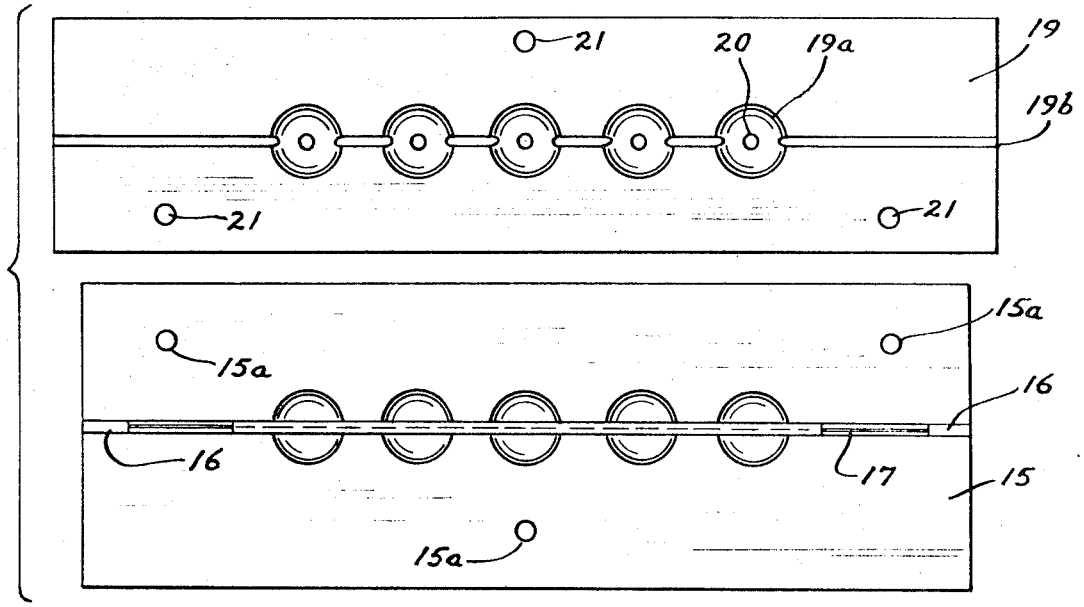
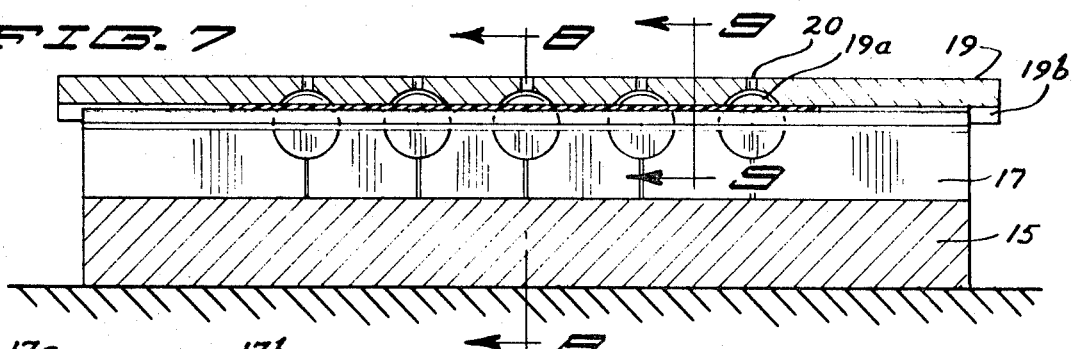
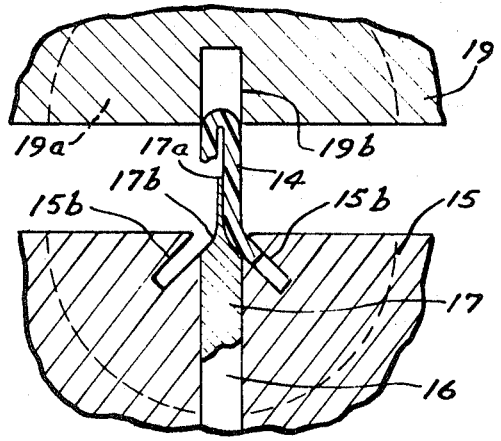
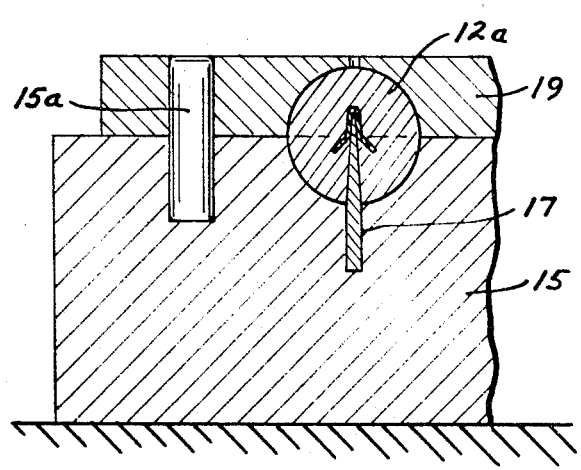
INVENTOR.
JOSEPH HRIBAR
BY John W. Adams
ATTORNEY

United States Patent Office 3,608,230
Patented Sept. 28, 1971

3,608,230
SINKER FOR FISHING LINES
Joseph Hribar, 1600 N. Broadway, Joliet, Ill. 60435
Filed May 19, 1969, Ser. No. 825,635
Int. Cl. A01k 95/00
U.S. Cl. 43—44.89      5 Claims

ABSTRACT OF THE DISCLOSURE

This disclosure relates generally to fishing line sinkers and more particularly to an improved split type sinker having a line-receiving slot which divides a major portion of the sinker into two segments which have cushioning and line gripping inserts interposed therebetween and which permit the sinker to be tightly clamped in the desired position onto the fishing line without damaging the line; and this disclosure also relates to the method and apparatus for making such sinkers.

---

For many years fishermen have used split lead sinkers which can be clamped onto a fishing line by merely squeezing the two segments together. In recent years monofilament fishing lines have been widely used and these lines are very susceptible to breakage if they are damaged in any way. Conventional split lead sinkers are cast in molds and frequently have rough surfaces or edges which can cause damage to the fishing lines when clamped thereon. Such damage causes breakage under tension well below the rated strength of the fishing lines.

It is the object of the present invention to provide a split fishing sinker having a gripping and cushioning insert which will positively grip the fishing line when the two sinker segments are clamped in the desired position onto the line.

It is another object to provide a sinker having such a line cushioning liner or insert which can be easily and inexpensively produced and which can be positively anchored to the sinker segments to cushion and grip the fishing line when the sinker is clamped thereon.

It is a further object to provide a split lead fishing sinker specifically designed to maintain a slight spaced relationship between the outer edges of the jaws formed by the two sinker segments to facilitate opening the jaws and adjusting the position of the sinker on the line or removing the same for subsequent use.

These and other objects and advantages of this invention will more fully appear from the following description made in connection with the accompanying drawing, wherein like reference characters refer to the same or similar parts throughout the several views of the drawing in which:

FIG. 1 is an elevational view showing a group of sinkers immediately following removal from the mold apparatus;

FIG. 2 is a perspective view of a sinker ready for mounting on a fishing line;

FIG. 3 is a central vertical sectional view taken substantially along the line 3—3 of FIG. 2 drawn to slightly enlarged scale;

FIG. 4 is an enlarged vertical sectional view taken substantially along the line 4—4 of FIG. 5;

FIG. 5 is an elevational view showing a sinker embodying my invention clamped to a fishing line;

FIG. 6 is a plan view showing the two mold sections in separated open position and showing a plastic insert mounted in the bottom mold section;

FIG. 7 is a central longitudinal sectional view through the mold sections when the same are in assembled operative position;

FIG. 8 is a transverse sectional view taken substantially along the line 8—8 of FIG. 7;

FIG. 9 is a transverse sectional view taken substantially along the line 9—9 of FIG. 7; and, FIG. 10 is a fragmentary prespective view showing, per se, the cavity-dividing separator of the mold assembly removed therefrom.

As shown in the accompanying drawing, I provide a split type fishsing sinker 12 made from any suitable soft bendable material such as lead which is adapted to be easily and positively clamped in the desired position onto a fishing line 13 having a hook H as best shown in FIG. 5.

The fishing sinker 12 embodying my invention is split into two segments 12a and 12b by the slot 12d which forms a pair of opposed jaws 12e and 12f. These two segments are connected together by a hinge or connecting portion 12c which permits the segments to be opened and closed. The lead material is sufficiently soft and bendable to permit the jaws 12e and 12f to be easily opened or closed while still providing sufficient strength so that when the jaws have been clamped on a fishing line the sinker will not slip.

My new sinker includes a pair of opposed cushioning insert sections 14 respectively secured to the jaws of each segment so that when the line is interposed between the jaws 12e and 12f the insert sections will engage the line (as best shown in FIG. 4) thus preventing damage to the line. In the form of the invention illustrated the insert sections 14 are formed from relatively thin soft plastic material such as polyethylene and are respectively received in interlocking relation in the sinker segments 12a and 12b. The jaws 12e and 12f diverge outwardly as best shown in FIGS. 3 and 4 so that when the line is clamped between the closed-end portions thereof the outer edges of the jaws will be maintained in slightly spaced apart relation thus facilitating gripping the jaws to permit easy separation thereof to remove the sinker or adjust the position of the same on the fishing line.

As best shown in FIGS. 6 through 10, I provide a mold structure which is adapted to facilitate the production of sinkers embodying my invention.

This mold includes a base section 15 and a cover section 19. The base section 15 has a plurality of upstanding registration and connection pins 15a and a longitudinal separator-receiving groove 16 formed therein. The lower portion of each mold cavity is formed in the mold base 15 and a cavity-dividing separator 17 is mounted in the groove 16. A knife edge 17a extends down from the top of the separator 17 to a plurality of spaced apart shoulders 17b each of which is provided with a curved guiding surface as best shown in FIGS. 9 and 10. The space between each pair of adjacent shoulders 17b has a recess 17c which conforms to the outer periphery of each lower cavity and the surface of each recess 17c is tapered to produce the slot 12d which defines the outwardly diverging jaws 12e and 12f as previously described.

The mold base section 15 has a pair of downwardly diverging slots 15b formed therein which communicate at their upper ends with the separator receiving groove 16 and the curved guiding surfaces of the shoulders 17b are positioned so that the outer edges thereof form smoothly contoured continuation of the lower downwardly diverging surfaces of the slots 15b, as best shown in FIG. 9.

The gripping and cushioning insert sections 14 are formed by longitudinally folding a strip of insert material and inserting the knife edge 17a between the folded insert sections 14. The lower edges of the sections of plastic strip 14 are pressed downwardly along the sides of the separator 17 and are guided into the diverging slots 15b by the curved shoulder surfaces 17b. These slots 15b hold the lower marginal portions of the cushioning insert sections 14 apart in downwardly diverging relation so that the material poured into each cavity flows around the sections 14 and imbeds the plastic into the material of the sinker.

The upper mold section 19 is provided with cooperating cavity portions 19a each having an access opening 20 through which the sinker material is poured into the mold cavities. A groove 19b is formed in the upper mold section 19 to receive the upper end portion of the separator 17 end with the insert sections 14 mounted thereon. The upper section 19 has a plurality of register openings 21 formed therein to respectively receive the pins 15a of the base section to hold the two sections together and in registration.

It will be seen that I have provided a relatively simple fishing sinker specifically designed to prevent damage to a fishing line. The apparatus and method for producing the sinkers described herein permits efficient production of split fishing sinkers.

It will of course be understood that various changes may be made in the form, details, arrangement, and proportion of the parts without departing from the scope of the invention, which generally stated, consists in the matter set forth in the accompanying claims.

What is claimed is:

1. As an article of manufacture, a reusable split sinker assembly for fishing lines having a pair of segments defining a pair of opposed jaws which form a line-receiving slot therebetween and provided with a bendable connection portion forming a hinge therebetween, a pair of insert sections of line-protecting cushioning material and having divering outer marginal edge portions extending across said slot with the diverging portions respectively imbedded in the material of said segments, with the inner portions of said insert sections lining only the inner portions of said opposed jaws.

2. The structure set forth in claim 1 and the diverging outer marginal edge portions of said insert sections being disposed at an acute angle to the opposed surfaces of said segment jaws.

3. The structure set forth in claim 1 and said insert sections being formed from a single elongated folded sheet.

4. The structure set forth in claim 1 and said insert sections being formed from soft plastic material.

5. The structure set forth in claim 4 and the soft plastic material being polyethylene.

References Cited

UNITED STATES PATENTS

| | | | |
|---|---|---|---|
| 2,502,875 | 4/1950 | Mortensen | 43—43.1 |
| 2,983,068 | 5/1961 | Grayson | 43—44.89 |

OTHER REFERENCES

Popular Mechanics magazine, March 1968, p. 176, article entitled "Stop sinker slipping."

SAMUEL KOREN, Primary Examiner

D. J. LEACH, Assistant Examiner

U.S. Cl. X.R.

164—129; 249—121